United States Patent Office 3,525,597
Patented Aug. 25, 1970

3,525,597
TRANSPARENT ZIRCONIA AND PROCESS FOR MAKING SAME
Khodabakhsh S. Mazdiyasni, Xenia, Charles T. Lynch, Fairborn, and Jonathan S. Smith II, Dayton, Ohio, assignors to the United States of America as represented by the Secretary of the Air Force
No Drawing. Continuation-in-part of application Ser. No. 570,146, Feb. 8, 1966. This application Nov. 13, 1968, Ser. No. 775,507
The portion of the term of the patent subsequent to Mar. 11, 1986, has been disclaimed
Int. Cl. C22b $59/00$; C01g $25/02$
U.S. Cl. 23—293                                    5 Claims

ABSTRACT OF THE DISCLOSURE

A high density, polycrystalline fully stabilized cubic zirconia body characterized by having a fine, uniform grain size, negligible porosity and which is stable in oxidizing environments at temperatures above 2000° C. and is capable of transmitting visible and infrared radiation, consisting essentially of high purity zirconia and about 6 mole percent of a high purity metallic oxide selected from the group consisting of yttrium oxide, dysprosium oxide and ytterbium oxide as a stabilizing additive and the method for preparing the same comprising the steps of completely mixing dried, fine particulate, high purity (1) zirconia and (2) a metallic oxide selected from the group consisting of yttrium oxide, dysprosium oxide, and ytterbium oxide, said metallic oxide being present in the amount of 6 mole percent weight of said zirconia, calcining the powder in air at 800° C. for 1 to 4 hours, grinding the resulting calcined material to a powder, hot pressing the powder in graphite die at pressures from about 4000 p.s.i. to 15,000 p.s.i. and at temperatures of 1000–1400° C. for 30 min. to 240 min. into compacted shapes.

---

The invention described herein may be manufactured and used by or for the United States Government for governmental purposes without the payment to us of any royalty thereon.

This application is a continuation-in-part of our application Ser. No. 570,146 filed Feb. 8, 1966, and is copending therewith.

This invention relates to ceramic bodies and more particularly to high density polycrystalline bodies of zirconia having improved high temperature properties and optical transmission properties compared to the high temperature and optical transmission properties of known zirconia bodies, and to the methods of processing to produce such improved zirconia bodies.

A problem solved by the invention and an object herein is the preparation of a fully stabilized high purity body consisting of zirconium oxide and a stabilizing additive, said body having improved stability in oxidizing environments at elevated temperatures and capable of transmitting visible and infrared radiation incident to thin sections of the body.

Prior methods of preparation of stabilized zirconia bodies have produced materials that were not completely stabilized, or required excessive concentrations of the stabilizing agent which was extremely costly when rare earths were used, or used stabilizing agents which were not effective under repetitive cycling at elevated temperatures. Prior methods have failed to produce stabilized zirconium oxide in bodies with sufficiently high density and with low porosity, fine grained microstructures, necessary to overcome the inherent opacity of refractory polycrystalline zirconium oxide made by conventional techniques. Thus polycrystalline zirconium oxide made by existing practices is not of value as a transmission medium for incident radiation.

Prior methods of preparation of refractory polycrystalline oxides which are transparent or translucent in the visible and infrared regions are illustrated by the patent, U.S. 3,026,210, and the literature reference Modern Ceramics, John Wiley and Sons, New York, 1965:215. The zirconium oxide prepared in accordance with the methods herein disclosed is inert to chemical attack by water vapor and $CO_2$ at elevated temperatures, which is not true for translucent BeO and MgO, and possesses a much higher useful temperature range than $Al_2O_3$ (melting point about 2050° C.). The melting point for $ZrO_2$ is in excess of 2700° C. For applications in arc lamps as a gas-tight envelope such as described in IEEE Spectrum 2:18, the $ZrO_2$ can be used to much higher temperatures than $Al_2O_3$.

Polycrystalline transparent $ZrO_2$ bodies, broadly of the illustrative composition $Y_2O_3 \cdot ZrO_2$ herein, may find general use in applications wherein a high degree of transmissivity of incident radiation is required at very high temperatures. Such uses include antenna windows, infrared domes, furnace windows, and arc lamps. The exceptional stability of the $Y_2O_3 \cdot ZrO_2$ to high temperature oxidizing environments should result in useful applications in heat shield, nose cone, and hot spot structures. Application of this material in thin layers as a coating to other refractory materials may prove a useful protective device in oxidizing and other corrosive atmospheres. $Y_2O_3 \cdot ZrO_2$ should also find application as a fuel cell membrane material for high temperature fuel cells.

A polycrystalline refractory body consisting essentially of zirconium oxide and a stabilizing additive is made which will transmit incident electromagnetic radiation. It is a zirconium oxide body of high density, high strength, and fully stabilized in the cubic phase, known to be an efficient transmitter of light. In 0.50 mm. thick sections a light transmission exceeding 10% of the incident light has been measured.

The body is prepared by double decomposition of zirconium and yttrium alkoxides from a mutual solvent to intimately mixed oxides which are then further processed by low temperature calcining, pressing, and sintering stages to a very low porosity, fine grained, high strength, body which is stable in oxidizing atmospheres to 2000° C. or above.

A polycrystalline refractory body of high density, with a fine-grained, low porosity microstructure, is made from an ultra high purity fine particle size zirconium oxide powder which contains homogeneously distributed through it a stabilizing oxide powder, also of high purity and fine particle size, of yttrium, dysprosium, or ytterbium oxide preferably (or other rare earth oxides wherein stabilization is not generally as good as with the preferred compounds). The fine powders are prepared in a highly activated state, intimately mixed, through the simultaneous decomposition of alkoxides of the zirconium and yttrium or rare earth metal to the oxides from a mutual solvent which results in a molecular dispersion of the alkoxides. The oxides are recovered from the solvent as they precipitate from the solution and further processed to high density compacts which upon appropriate heat treatments, result in fully stabilized zirconium oxide bodies which will transmit incident light, visible, and infrared.

The alkoxides are used in direct proportion to the concentrations of oxides that are desired in the final mixed oxides. A solution typically is prepared of high purity zirconium isopropoxide, $Zr(OC_3H_7)_4$, and yttrium isopropoxide, $Y(OC_3H_7)_3$, in a mutual solvent such as n-hexane, $C_6H_{14}$, or benzene, $C_6H_6$, and the solution vigorously stirred while triply distilled or demineralized water is slowly added dropwise to the solution. The mixed oxides precipitate quantitatively from the solution as a result of the hydrolysis of the alkoxides.

$$2Y(OC_3H_7)_3 + 3H_2O \rightarrow Y_2O_3 + 6C_3H_7OH \quad (1)$$
$$Zr(OC_3H_7)_4 + 2H_2O \rightarrow ZrO_2 + 4C_3H_7OH \quad (2)$$

A general reaction is applicable where R is an alkyl, aryl or substituted alkyl and M is Dy or Yb which have in the same valence state (+3), similar atomic size and electronegativity to Y, and therefore can be substituted for Y as the stabilizing metal of choice of the mixed oxide with zirconium oxide where desired:

$$Zr(OR)_4 + 2H_2O \rightarrow ZrO_2 + 4ROH \quad (3)$$
$$M(OR)_3 + 3H_2O \rightarrow M_2O_3 + 6ROH \quad (4)$$

The basic requirements for the alkoxide are that the hydrolysis reaction be rapid and quantitative, and in cases where the alkoxy (—OR) group is quite stable to hydrolysis, a catalyst such as a small amount of an acid catalyst may be added. The isopropoxides are preferred for their relative ease of synthesis and the instantaneous quantitative hydrolysis reaction to form fine particulate oxides of high purity. The oxides are at this point in a finely divided state of submicron (to a few microns in aggregates) particle size and of extremely high purity.

The two oxides, $Y_2O_3$ and $ZrO_2$ are completely mixed in beginning the process. The preparation of a high density, fully stabilized zirconium oxide body from the mixed oxides is accomplished by the following steps:

(1) The powder, wet with benzene or other solvent, is dried at 100–110° C. in air, preferably for at least 24 hours, longer if desired, and then ground to effect communication of any aggregates. The fine, dry powder is extremely active due to high surface area of the particulates, and clean surfaces. Contamination with $H_2O$ or $CO_2$ from the air is minimized by avoiding excessive contact with the air.

(2) Powders are stored in desiccators over $MgClO_4$ or other suitable drying agents.

(3) The powder is calcined in air at 800° C., 1 to 4 hours or more as desired, and again crushed to a fine powder.

(4) The calcined powder is cold pressed unaxially or isostatically at 50,000 to 200,000 p.s.i. into compacted shapes.

(5) The compacted bodies are then sintered in air at 1450° C. for 16 hours or longer as desired. The resultant body approaches the theoretical density [6.1 gm./cm.$^3$ for a 6 mole percent $Y_2O_3$—$ZrO_2$ stabilized cubic body], reaching 5.5 to 6.0 gm./cm.$^3$ for the 6 mole percent $Y_2O_3$—$ZrO_2$ body which is fully cubic.

It is possible to use a sintering aid such as LiF to reduce the time necessary to reach high density at any given temperature. LiF has been added at 2% levels which reduced the compaction pressure range to 25,000 p.s.i. as a lower limit. Desired range for the addition is 0.1 to 3%. The LiF is vaporized out of the body at the 1450° C. sintering temperature. There is no reason that hot pressing could not be used as the preferred processing method. For the hot pressing method, the first three steps 1–3 of the cold pressing and sintering example of this disclosure must be followed. The 800° C. calcined powder from step three is then hot pressed in a graphite or a graphite composite die, which contains graphite-filament reinforcement of the graphite. Hot pressing is done uniaxially or multiaxially at 4000 to 15,000 p.s.i. and at temperatures of 1000 to 1400° C. for 30 to 240 minutes into compacted shapes. The resultant body approaches theoretical density (6.1 gm./cm.$^3$ for a 6 mole percent $Y_2O_3$—$ZrO_2$ stabilized cubic body). When hot pressing or slip casting methods are preferred, precautions must be used not to introduce impurities during the processing, and no binder material remains after the dense body is formed. In slip casting the removal of all bubbles of entrapped gas from the slip is extremely important. Slip casting is followed by sintering. Cold pressing has been used as the simplest and most straight forward approach to taking advantage of the powders prepared from the alkoxide decomposition process.

The amount of stabilization that occurs is dependent on the amount of yttrium oxide employed as the stabilizing agent. In Table I the results show that a minimum of 6 mole percent (10.5 weight percent) yttrium oxide is necessary to obtain complete cubic-phase stabilization. The fine-powdered mixture is in the virtually all-tetragonal phase at 4 mole percent (7.1 weight percent) yttrium oxide additions with perhaps some of the cubic phase present. Below this level the second phase is the monoclinic phase which is deleterious to the body in high temperature uses because of the volume change associated with the monoclinic-tetragonal transformation.

TABLE I

| Additive | Mole percent | Wt. percent $Y_2O_3$ in $ZrO_2$ | Stabilization of $ZrO_2$ obtained |
|---|---|---|---|
| $Y_2O_3$ | 1 | 1.82 | 60% monoclinic. |
| $Y_2O_3$ | 2 | 3.61 | 40–50% tetragonal. 50–60% monoclinic. |
| $Y_2O_3$ | 3 | 5.36 | 60% tetragonal. |
| $Y_2O_3$ | 4 | 7.10 | 100% tetragonal (some cubic). |
| $Y_2O_3$ | 5 | 8.80 | 100% tetragonal + cubic. |
| $Y_2O_3$ | 6 | 10.47 | 100% cubic. |

Literature references and commercial practice show that with stabilization of conventional zirconium oxide powders with yttrium oxide requires that a minimum of 8 mole percent yttrium oxide must be added to achieve a 100% cubic body with a firing temperature of 2000° C. or above. Illustrative references are J. Electrochem. Society, 98:356 and J. Am. Ceram. Soc., 48:372.

At lower temperatures where equilibrium values are not approached for the yytria-zirconia system a concentration of 15 mole percent yttria has been necessary for full stabilization of cubic zirconia at 1750° C.

The intimate mixing of highly active fine particulates in the described alkoxide decomposition process is responsible for obtaining "true equilibrium" conditions for the stabilized body, i.e. the requirement of no more than 6 mole percent additive to achieve stabilization. From an economic standpoint this is of importance in keeping the cost of the stabilized body as low as possible, the $Y_2O_3$ being much more expensive than the $ZrO_2$ on a weight basis.

A body prepared by the methods outlined in this disclosure was fired for 262 hours at temperatures to 2050° C. in a flowing air atmosphere of a gas fired furnace. The following results are indicative of the stability of the structure in this extreme environment:

(1) The original grain size was 2–5$\mu$; grain size after firing was 35–50$\mu$ with no irregular grain growth observed. The high purity specimen fired had no grain growth inhibitor added, and thus, the resultant grain growth is actually surprisingly small.

(2) In one specimen the density decreased from 5.2 gm./cm.$^3$ to 5.1 gm./cm.$^3$ which is not significant since it is close to the experimental error of the particular density determination. It is accountable in part to the loss of hard-to-remove volatiles in such a long-firing, and in part to aforementioned experimental variations in measurement. This particular body was below the density of many of the other bodies. In another typical example, the density of a 6.0 gm./cm.$^3$ body did not change on firing which in terms of the experimental determination meant that the change was less than ±0.1 gm./cm.$^3$ TABLE II.—X-RAY DIFFRACTION POWDER LINE DATA OF THE MIXED OXIDE $Y_2O_3$–$ZrO_2$ AFTER ROASTING AT 2,050° C. FOR 262 HRS.

| Line | 2θ | $I/I_0$ | d |
|---|---|---|---|
| 1 | 30.19 | 100 | 2.959 |
| 2 | 34.94 | 30 | 2.567 |
| 3 | 50.16 | 95 | 1.819 |
| 4 | 59.58 | 95 | 1.551 |
| 5 | 62.52 | 20 | 1.486 |
| 6 | 73.65 | 10 | 1.286 |
| 7 | 81.38 | 30 | 1.181 |
| 8 | 81.60 | 30 | 1.182 |
| 9 | 83.94 | 20 | 1.512 |
| 10 | 84.22 | 20 | 1.152 |
| 11 | 94.23 | 30 | 1.051 |
| 12 | 94.56 | 30 | 1.051 |
| 13 | 102.02 | 30 | 0.991 |
| 14 | 102.35 | 30 | 0.991 |
| 15 | 116.00 | 30 | 0.908 |
| 16 | 116.09 | 30 | 0.910 |
| 17 | 124.55 | 50 | 0.870 |
| 18 | 125.05 | 50 | 0.870 |
| 19 | 127.66 | 30 | 0.858 |
| 20 | 128.16 | 30 | 0.858 |
| 21 | 142.13 | 40 | 0.814 | where θ is the angle of incidence which reflections occur and $I/I_0$ is the relative intensities of the absorption peaks and $d$ is the distance between planes having Miller indices $h, k, l$.

(3) X-ray evidence showed that no destabilization had occurred. In Table II, the X-ray diffraction pattern of the mixed oxide after heat treatment is shown. The phase indicated is fully cubic. Under the conditions of the firing commercially stabilized $ZrO_2$ using CaO or MgO would have severely deteriorated as a result of destabilization to the monoclinic phase, and consequent cracking and disintegration of the body on thermal cycling.

(4) The mole percent $Y_2O_3$ before and after firing remained constant indicating no loss of stabilizing agent during test.

(5) The microstructure showed no evidence of microcracks or any deterioration along laminations which were originally present in a few of the specimen bodies. The specimens were thus completely stable in the environment to which they were exposed, and no evidence of chemical or physical reaction was observed.

(6) Spectrographic analysis for impurities showed no measurable pick-up of any elements except for 100–200 p.p.m. of Ca which came from the container tube of the furnace in which the experiments were carried out. The body had also been fired for shorter periods of time at temperatures to 2200° C. For very short time periods, in terms of an hour or less, this material should be useful to temperatures of almost 2500° C. the major limitation being the loss of the stabilizer $Y_2O_3$ at the higher temperatures.

Thin sections of a body made by the process described in this disclosure have the property transmitting significant amounts of radiation in the visible and infrared regions of the spectrum. While single crystal oxides such as sapphire, which is single crystal $Al_2O_3$, have been known to have optical transmission, the preparation of polycrystalline refractory oxides with the property of optical transmission has been a comparatively recent development.

Preparation of polycrystalline bodies of $Al_2O_3$ with improved optical transmission properties was one in which MgO was added in small amounts of less than 1 wt. percent to $Al_2O_3$ of submicron to a few microns particle size in which the total impurity content was 0.4% or less and the body pressed and sintered to form a high density, polycrystalline $Al_2O_3$ of low porosity with improved optical transmission characteristics. This high density, polycrystalline $Al_2O_3$ has application as a ceramic arc tube for a sodium vapor lamp. The $Al_2O_3$ process is one of forming a spinel, $MgAl_2O_4$, as a second phase which accelerates the sintering of this high density body while effectively preventing abnormal grain growth and eliminating trapped pores. The presence of MgO is not necessary to preserve the light transmission characteristics of the final body which differentiates $Al_2O_3$ from the $Y_2O_3 \cdot ZrO_2$ composition of the present invention in which the second phase of $Y_2O_3$ is necessary to achieve a stabilized body which will retain the unique characteristics of the body at elevated temperatures. Furthermore, the $Y_2O_3$ prepared with the $ZrO_2$ by the described process remains in solid solution with the $ZrO_2$ so that no second phase is originally present. Using conventional ceramic materials, a second phase of $Y_2O_3$ will often be found if more than 3 to 4 mole percent $Y_2O_3$ is present in the final body. This is due to the aforementioned failure in most commercial products to achieve complete solid state reaction under the firing conditions and firing times employed. The presence of such a second phase is generally deleterious to the optical properties in the same manner as the presence of more than a 0.1% magnesium as spinel reduces the transparency of an alumina body. Any abnormal grain growth, segregation of impurities, inhomogeneous porosity, or second phase formation generally reduces the efficiency of a polycrystalline oxide as an optical transmitting medium.

TABLE III.—PHOTOMETER READINGS IN PERCENT TRANSMISSON

| Material | No filter | Yellow filter | Orange filter | Green filter | Red filter |
|---|---|---|---|---|---|
| Glass | 100 | 40 | 36 | 32 | 16 |
| Lucalox | 12 | 6.5 | 3 | 3 | 1 |
| Teflon | 10 | 6.4 | 3 | 3 | 1 |
| $Y_2O_3.ZrO_2$ | 11 | 6.4 | 3 | 3 | 1 |

In Table III, photometer readings of the relative percent transmission of an alumina, a polymer, and $Y_2O_3 \cdot ZrO_2$ with respect to glass using several filters are given. All specimens were 1.2 mm. thick. These readings indicate that the results with the $Y_2O_3 \cdot ZrO_2$ are comparable to those of alumina and superior to those of the polymer. The transmission of light is such that words can be read clearly on a piece of paper held behind a sample of the $Y_2O_3 \cdot ZrO_2$ as a result of transmitting light without undue distortion. Thus the term transparent could be used in the visible region even though the passage of light is in the order of only a few percent, therefore, not equivalent to that of a glassy phase oxide (as distinguished from polycrystalline refractory oxides) such as ordinary window glass. In this region it might be generally preferable to consider this as a marginally efficient transmitter.

Lettering is seen directly through a $Y_2O_3 \cdot ZrO_2$ piece that is 1.2 mm. thick, showing relatively distortion free transmission of light in the visible region.

Transmission data in the near infrared and medium infrared regions were obtained on a Cary Spectrophotometer out to 15,000 A. (1.5μ) and on a Perkin-Elmer Model 521 infrared spectrometer. With both instruments there is considerable loss in measured transmission due to loss in surface reflection and in scattering of the incident beam, which then does not reach the sensor. Therefore the measured results may be experimentally low, giving a conservative measure of transmission characteristics. Even with these limitations a 1.2 mm. thick $Y_2O_3 \cdot ZrO_2$ body was found to transmit fully 10% of the incident radiation from 8000 A. (0.8μ) out to 15,000 A. where the transmission dropped off to 4% and remained at this level to 80,000 A. (8.0 μ). At this point the transmission dropped further to 2% and remained at 1–2% out to the limit of the Perkin-Elmer spectrometer at 400,000 A. (40μ). Transmission values exceeding 10% of the incident radiation were achieved with 0.5 mm. thick specimens. In several specimens an increase in absorption beyond 150,000 A. (15μ) was noted similar to that previously observed for translucent $Al_2O_3$ and MgO, which transmit to 8 to 10μ, then do not transmit radiation until beyond 30–40μ, where they commence transmitting incident radiation again.

We claim:

1. The method for preparing a high density fully stabilized cubic zirconia body comprising the steps of completely mixing dried, fine particulates of high purity (1) zirconia and (2) a metallic oxide selected from the group consisting of yttrium oxide, dysprosium oxide, and ytterbium oxide, said metallic oxide being present in the amount of 6 mole percent weight of said zirconia, calcining the powder in air at 800° C. for 1 to 4 hours, grinding the resulting calcined material to a powder, hot pressing the powder at 1000–1400° C. at 4000 to 15,000 p.s.i. for 30 minutes to 24 minutes.

2. The method of claim 1 in which the metallic oxide is yttrium oxide.

3. The method of claim 1 in which the metallic oxide is dyprosium oxide.

4. The method of claim 1 in which the metallic oxide is ytterbium oxide.

5. The method of claim 1 in which the metallix oxide is the mixture of yttrium, dysprosium, and ytterbium oxides.

References Cited

UNITED STATES PATENTS

| | | | |
|---|---|---|---|
| 3,247,000 | 4/1966 | Taylor | 106—57 |
| 3,303,033 | 2/1967 | La Grange et al. | |
| 3,297,414 | 1/1967 | Mazdyasini et al. | 23—140 X |

OTHER REFERENCES

Mazdiyasni et al.: "Journal of the American Ceramic Soc. vol. 48, July 1965, pp. 372–375.

HERBERT T. CARTER, Primary Examiner

U.S. Cl. X.R.

23—21, 140, 300; 264—65, 66